United States Patent Office 2,787,624
Patented Apr. 2, 1957

2,787,624

PROCESS FOR CONVERTING Δ⁴-3-KETO-6-OXY PREGNENES TO Δ⁴-3-KETO PREGNENES

Louis F. Fieser, Belmont, Mass., assignor to Merck & Co., Inc., Rahway, N. J., a corporation of New Jersey No Drawing. Application December 18, 1952,
Serial No. 326,788

7 Claims. (Cl. 260—397.45)

This invention relates to a novel method of selectively reducing hydroxy steroid compounds whereby the hydroxy substituent is removed and replaced by a hydrogen atom. More particularly, it is concerned with a process for reducing γ-hydroxy-α,β-unsaturated ketones and γ-acyloxy-α,β-unsaturated ketones of the steroid series to obtain the corresponding α,β-unsaturated ketones.

It has recently been found that the introduction of oxygen into the 11-position of an 11-desoxy steroid can be effected by subjecting such steroids to the action of certain oxidizing fungi or oxidizing enzymes of such fungi. The resulting oxygenated compound having an oxygen in the 11-position is useful as an intermediate in the preparation of adrenal cortical hormones such as cortisone, hydrocortisone, and the like. Unfortunately, other positions such as the 6-position, as well the 11-position, undergo oxygenation to produce dioxygenated products which must be treated further to remove the undesirable oxygen substituent before they can be utilized as intermediates in the production of cortisone and similar compounds. For example, when progesterone is subjected to the action of suitable fungi or enzymes of such fungi, there is obtained in addition to the desired 11-hydroxy-progesterone the dioxygenated product, 6,11-dihydroxy-progesterone.

Heretofore no satisfactory method was available whereby a γ-hydroxy-α,β-unsaturated ketone of the steroid series, such as 6,11-dihydroxy-progesterone, could be reduced to remove the hydroxyl substituent without simultaneously reducing either the unsaturated bond or the keto group. Thus, no method was available whereby 6,11-dihydroxy-progesterone could be converted directly to the desired 11-hydroxy-progesterone.

It is an object of the present invention to provide a process for reducing γ-hydroxy-α,β-unsaturated ketones and γ-acyloxy-α,β-unsaturated ketones of the steroid series to the corresponding α,β-unsaturated ketones. Other objects will be apparent from the detailed description of my invention hereinafter provided.

In accordance with this invention, it is now found that γ-hydroxy-α,β-unsaturated ketones and γ-acyloxy-α,β-unsaturated ketones of the cyclopentanopolyhydrophenanthrene series can be selectively reduced to the corresponding α,β-unsaturated ketones by reaction with zinc in the presence of an acid. It is found that in the process of carrying out this reduction with zinc in the presence of a suitable acid, the other reducible functions of the steroid molecule such as the unsaturated bond and the keto group remain substantially unaffected, and the desired unsaturated ketone can be readily recovered in excellent yields.

In carrying out this reduction the hydroxy or acyloxy containing cyclopentanopolyhydrophenanthrene compound is intimately contacted with zinc in the presence of a suitable acid. Generally, I prefer to carry out the process of my invention by warming the reaction mixture since under these conditions shorter reaction times are required.

The reduction is most conveniently effected in the presence of a lower aliphatic acid such as acetic acid, propionic acid, butyric acid, and the like, or mixtures thereof, although a non-oxidizing mineral acid such as hydrochloric acid can also be employed. When a mineral acid such as hydrochloric acid is used in this reaction, I find that it is preferable to use about one equivalent of the acid in order to avoid any reduction of the unsaturated bond and/or other reducible substituents of the steroid compound.

I prefer to carry out my selective reduction process in the presence of a lower aliphatic monocarboxylic acid since the quantity of such acids is not critical and substantially no undesired reduction occurs even under vigorous reaction conditions. Thus, the selective reduction process is conveniently and readily effected using acetic acid. With acetic acid, the time necessary for effecting the reduction will depend upon the particular compound being reduced and the temperature at which the reaction is effected. Generally, I find it desirable to warm the reaction mixture to a temperature within the range of about 50–125° C. At these temperatures the reduction requires about 2–15 hours, depending upon the particular compound being reduced.

After the reduction is complete the α,β-unsaturated ketone is readily recovered from the resulting reaction mixture by conventional procedures known in the art. Thus, the reaction mixture can be diluted with water and the product recovered by extraction with a suitable water immiscible solvent for the products such as ether and the like.

The process of my invention can be effected with either a γ-hydroxy-α,β-unsaturated ketone or a γ-acyloxy-α,β-unsaturated ketone to selectively reduce the γ-hydroxy group or the γ-acyloxy group. Thus, for example, the process of my invention can be utilized to convert 6,11-dihydroxy-progesterone and 6,11-diacetoxy-progesterone to 11-hydroxyprogesterone and 11-acetoxy-progesterone, respectively. The process is effective when the hydroxy group is in either the α or the β position.

γ-Hydroxy-α,β-unsaturated ketones of steroids which can be reduced in accordance with the process of the present invention to obtain the corresponding α,β-unsaturated ketone that might be mentioned are Δ⁴-3,20-diketo-6β,21-dihydroxy-pregnene, Δ⁴-3,20-diketo-6β,21-acetoxy-pregnene, Δ⁴-3,20-diketo-6β,17α,21-trihydroxy-pregnene, Δ⁴-3,20-diketo-6β,21-dipropionoxy-17α-hydroxy-pregnene, 6,11-dihydroxy-progesterone, 6,11-diacetoxy-progesterone, Δ⁴-3-keto-6β-hydroxy-cholestene, Δ⁴-3-keto - 6β - acetoxy-cholestene, Δ⁴-3-keto-6α-hydroxy-cholestene, Δ⁴-3-keto-6α-acetoxy-cholestene, Δ⁴-3,20-diketo-6α,21-diacetoxy-11-hydroxy - pregnene, 6α - hydroxy - corticosterone, 6β - hydroxy-corticosterone, Δ⁴-3,20-diketo - 6β,17α - dihydroxy-21-acetoxy-pregnene, Δ⁴-3-hydroxy - 6 - keto - cholestene, Δ⁴-3-acetoxy-6-keto-cholestene, Δ⁴ - 3 - keto - 6 - hydroxy-etiocholenic acid and Δ⁴-3-keto-6-acetoxy-etiocholenic acid.

As indicated above, the process of my invention is particularly useful in converting 6,11α-dihydroxy-progesterone, obtained by subjecting progesterone to the action of enzymes or fungi of the genus Rhizopus. Thus, in accordance with the process of this invention, this dihydroxy compound can be readily converted to 11α-hydroxy-progesterone which can then be utilized as an intermediate in the preparation of adrenal cortical hormones. Thus, by oxidizing the 11-hydroxy group to an 11-keto group and introducing hydroxyl substituents at carbon atoms 17 and 21 by processes known in the art, 11α-hydroxy-progesterone may be converted to cortisone.

The examples which follow are presented as illustrative embodiments of methods which may be employed in carrying out the process of my invention.

EXAMPLE 1

*Reduction of $\Delta^4$-cholestene-6β-ol-3-one-6-acetate to $\Delta^4$-cholestene-3-one*

500 milligrams of $\Delta^4$-cholestene-6β-ol-3-one-6-acetate, M. P. 99° C., was refluxed for 15 hours with 500 mg. of zinc dust in 10 ml. of acetic acid. At the end of this time the reaction mixture was diluted with water, extracted with ether, and the ethereal extract concentrated to dryness. Recrystallization of the residue from methanol yielded $\Delta^4$-cholestene-3-one, as large needles, M. P. 80–81° C.

*Analysis.*—Calc'd. for $C_{27}H_{44}O$: C, 84.31; H, 11.53. Found: C, 84.08; H, 11.48.

The melting point was not depressed on admixture of the product with authentic $\Delta^4$-cholestene-3-one.

EXAMPLE 2

*Reduction of $\Delta^4$-cholestene-6β-ol-3-one to $\Delta^4$-cholestene-3-one*

A mixture of 1 g. of $\Delta^4$-cholestene-6β-ol-3-one with 2 g. of zinc dust in 25 ml. of acetic acid was refluxed for about 15 hours. The mixture was then filtered, diluted with water and extracted with ether. The crystalline solid obtained on concentration of the ethereal extract was recrystallized from methanol. From the methanol solution there was crystallized cholestane 3,6-dione, M. P. 170–172° C.

Chromatography of the methanolic mother liquor on alumina and elution with petroleum ether yielded $\Delta^4$-cholestene-3-one, M. P. and mixed M. P. 80–82° C.

EXAMPLE 3

*Reduction of $\Delta^4$-cholestene-6α-ol-3-one-6-acetate to $\Delta^4$-cholestene-3-one*

430 milligrams of $\Delta^4$-cholestene-6α-ol-3-one-6-acetate was refluxed for about 15 hours with 1 g. of zinc dust and 25 ml. of acetic acid. The mixture was then diluted with water, filtered, and extracted with ether. On chromatography of the ethereal extract on alumina and elution with petroleum ether there was obtained from the petroleum ether eluate $\Delta^4$-cholestene-3-one, M. P. 80.5–81.5° C. The same product was isolated when $\Delta^4$-cholestene-6α-ol-3-one was employed as starting material.

$\Delta^4$-cholestene-6α-ol-3-one-6-acetate used in this example was prepared by treating a chloroformic solution of $\Delta^4$-cholestene-6β-ol-3-one acetate with dry hydrogen chloride at 0° C. The 6α-acetoxy compound isolated from the reaction mixture had M. P. 103.4° C., $[\alpha]_D = +75°$ (CHCl₃). Saponification of this latter derivative yielded $\Delta^4$-cholestene-6α-ol-3-one, M. P. 155–156.5° C.

$$[\alpha]_D = +81° \text{ (CHCl}_3\text{)}$$

EXAMPLE 4

*Reduction of 6,11α-dihydroxy progesterone to 11α-hydroxy progesterone*

10 milligrams of 6,11α-dihydroxy progesterone obtained by the oxidation of progesterone with a fungus of the genus Rhizopus and 50 mg. of zinc dust in 3 ml. of glacial acetic acid were heated with stirring for 3 hours at 70° C. The reaction mixture was then cooled and filtered. Water was added and the solution extracted with chloroform. The chloroform extract was concentrated to dryness. A portion of the residue was dissolved in fresh chloroform and paper chromatographed using formamide-methanol as the stationary phase and benzene as the mobile phase. In this way it was shown that 11α-hydroxy progesterone, identical to a known sample, was present in the reaction mixture.

EXAMPLE 5

*Reduction of methyl-3α-acetoxy-11α-hydroxy-7-keto-$\Delta^8$-cholenate to methyl-3α-acetoxy-$\Delta^8$-7-keto-cholenate*

A mixture of 70 milligrams of methyl-3α-acetoxy-11α-hydroxy-7-keto-$\Delta^8$-cholenate, 0.2 g. of zinc dust, 5 cc. acetic acid, 0.5 cc. water was held on steam bath for 2 hours. Filtration and dilution with water gave a solid that on recrystallizing from methanol gave 33 mg. of methyl-3α-acetoxy-$\Delta^8$-7-keto-cholenate, M. P. 181° C. Mixed M. P. with an authentic sample was undepressed.

The methyl-3α-acetoxy-11α-hydroxy-7-keto-$\Delta^8$-cholenate was prepared from methyl-3α-acetoxy-$\Delta^{7,9,11}$-choladiene by treatment of the latter compound with N-brom-succinamide in tertiary butanol in the presence of a small amount of sulfuric acid. The reaction mixture was held at 0° C. for one hour and then aged at 25° C. for 20 hours. It was then treated with sodium bisulfite in water, extracted with ether, and the residue from the ethereal extract dissolved in benzene. By chromatography on alumina and elution with benzene in ether (1:1) the desired product was obtained. On recrystallization from methanol it melted at 169–170° C., $\alpha_D = +3.2°$ (chloroform).

EXAMPLE 6

*Reduction of 6,11α-dihydroxy-progesterone to 11α-hydroxy-progesterone*

52 milligrams of pure 6,11α-dihydroxy-progesterone obtained by the oxidation of progesterone by a species of the fungus Rhizopus, 100 mg. of zinc dust and 3 ml. of glacial acetic acid were refluxed 2¼ hours. The reaction mixture was cooled to room temperature and 5 ml. of water added. The steroid was extracted with two 5 ml. portions of chloroform. The combined extracts were washed with 3 ml. of water and dried over anhydrous sodium sulfate. The solvent was evaporated and traces of acetic acid removed in vacuo. This residue was dissolved in 0.3 ml. warm ethyl acetate. Upon cooling a white solid crystallized. It melted at 162–166° C. (microblock), rotation $[\alpha]_D^{23} + 172.5°$ (c, 0.374%, chloroform). These data are correct for the desired product. Infrared comparison showed it to be identical with an authentic sample of 11α-hydroxy-progesterone.

Various changes and modifications in the procedure herein described may occur to those skilled in the art, and to the extent that such changes and modifications fall within the purview of the appended claims, it is to be understood that they constitute part of my invention.

I claim:

1. The process which comprises intimately contacting a steroid from the group consisting of $\Delta^4$-3-keto-6-hydroxy pregnenes and $\Delta^4$-3-keto-6-acyloxy pregnenes wherein the acyl group is a lower fatty acid radical, with zinc in the presence of an acid to produce the corresponding $\Delta^4$-3-keto pregnene.

2. The process of claim 1 wherein the acid is a non-oxidizing mineral acid.

3. The process of claim 1 wherein the acid is hydrochloric acid.

4. The process of claim 1 wherein the acid is a lower aliphatic acid.

5. The process of claim 1 wherein the acid is acetic acid.

6. The process which comprises reacting 6,11-dihydroxy-progesterone with zinc in the presence of a lower aliphatic acid to produce 11-hydroxy-progesterone.

7. The process which comprises reacting 6,11-dihydroxy-progesterone with zinc in the presence of acetic acid to produce 11-hydroxy-progesterone.

References Cited in the file of this patent

UNITED STATES PATENTS 2,520,656     Reichstein _____ Aug. 29, 1950

FOREIGN PATENTS 612,129     Great Britain _____ 1948

OTHER REFERENCES

Fieser et al.: "Natural Products Related to Phenanthrene," 3d ed., 1949, p. 146.